Dec. 21, 1943.   W. R. KEPLER   2,337,247
METHOD OF MAKING MULTILAYER VESSELS
Filed April 29, 1938
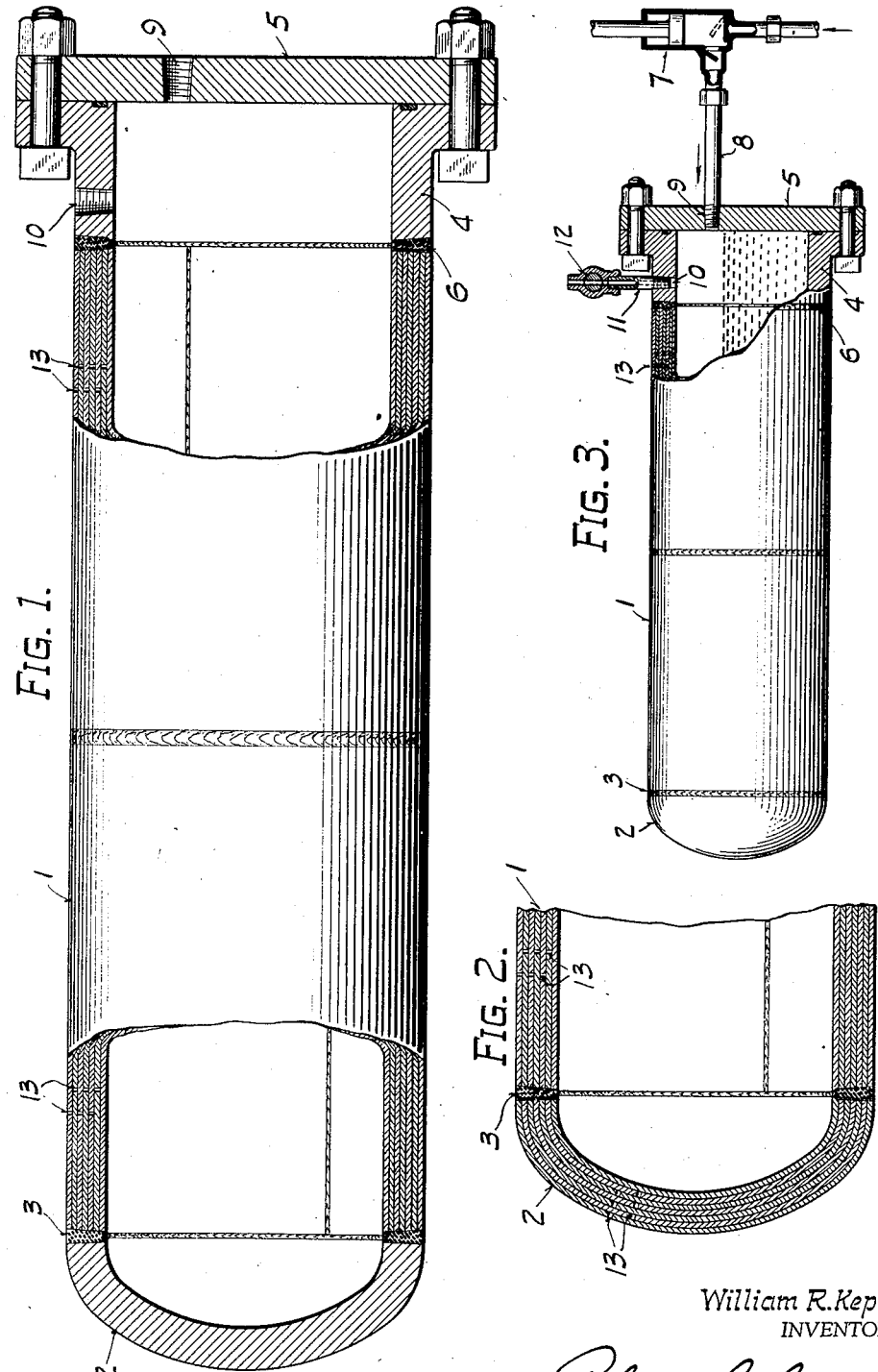
William R. Kepler
INVENTOR.
BY
ATTORNEY.

Patented Dec. 21, 1943

2,337,247

UNITED STATES PATENT OFFICE 2,337,247

METHOD OF MAKING MULTILAYER VESSELS

William R. Kepler, Wauwatosa, Wis., assignor to A. O. Smith Corporation, Milwaukee, Wis., a corporation of New York Application April 29, 1938, Serial No. 204,937

1 Claim. (Cl. 29—148.2)

This invention relates to methods of making pressure vessels capable of withstanding high internal pressures, and having shell sections made up of a number of layers of concentrically arranged tubular members in close contact.

The general method of manufacturing multilayer vessels is described in United States Letters Patent #1,925,118 issued on September 5, 1933, to Richard Stresau and reference is made to such patent for particulars regarding the method.

Generally speaking, the method set forth in the aforesaid patent for making multi-layer vessels is to roll relatively thin plates into cylindrical shape and to follow this operation by welding the longitudinal meeting edges of the plate to form a tubular member. Additional layers are formed in a similar manner and pressed into tight engagement one over another. The welding process is performed while the layers are held in such engagement. One dimension of the plates used will be progressively greater to compensate for the increased circumference of the shell section caused by the building up of layers and should be such that when an outer layer is disposed around an adjacent inner layer and clamped in close engagement the edges will be in proper spaced position for welding.

The longitudinal seams may be disposed circumferentially of the shell in staggered or coinciding relationship. In either event the previously fabricated section may be used as a backing plate for welding of the seams as subsequent layers are applied. In the former arrangement after the welding of each layer, the seam should be ground flush to provide a smooth surface over which the next layer may be drawn in tight engagement. Following the welding operation, shrinkage of the weld will cause additional contraction and tightening of the layers one upon another.

Various means have been employed for tightening the layers and maintaining them in close contact during welding. Clamps and bands have been applied to the exterior of the shell and means have been suggested to press against the inner sides to bring the layers into better nesting relation. By none of these mechanical means, however, is it possible to get a perfectly tight fit because there are tolerances which creep into factory operations rendering such perfection practically impossible.

It is an object of the present invention to provide a method of manufacturing layer vessels whereby the layers of the vessel may be brought into closer contact than they have been brought by any method heretofore employed.

It is a further object of the invention to provide a pre-stressing operation in the manufacture of multi-layer vessels whereby the inner layers of the vessel will be expanded against the outer layers and the stresses created by internal pressure in service will be distributed more uniformly over all the layers including the outermost layer.

Reference is made to the accompanying drawing in which:

Figure 1 is a side elevational view of a pressure vessel of the class described, the end portions being shown in section;

Fig. 2 is a longitudinal section of a modified form of head; and

Fig. 3 is a view similar to Fig. 1 on a reduced scale showing one end only in section, and diagrammatically illustrates apparatus for pre-stressing the shell sections.

In the accompanying drawing the shell section 1 is composed of a number of layers of relatively thin plates formed in the manner previously described. Head 2 is ellipsoidal in form and is joined to the cylindrical section 1 by a girth joint 3. It will be observed that this joint extends the full depth of the shell section and as such may be welded in the same manner as the seams in single layer pressure vessels having great wall thickness. Instead of using a single layer machined or forged ellipsoidal head, a head made from layers may be employed, as described by the Stresau patent and illustrated in Fig. 2.

Welded to the other end of the vessel shown is a conventional flanged head 4 provided with a suitable closure 5. Head 4 is welded to the intermediate shell section 1 at seam 6 in the same manner as head 2. It should be understood that both heads may be flanged or both may be ellipsoidal or any other shape and they may be eliminated without departing in any way from the present invention.

In carrying out the present invention, after the vessel is completely formed and welded, it is closed and pressure is applied to the interior of the vessel to expand the walls. To accomplish this, the closure or head 5 is placed on the open end of the vessel and securely fastened in any suitable manner. A light oil or other suitable fluid is then forced into the vessel from a piston pump 7 through a pressure tube 8 threaded into an aperture 9 in the closure 5. The fluid employed should be relatively incompressible and should also be relatively inexpansible at the temperatures and pressures employed in order to avoid danger of rupturing the vessel upon passing the yield point of the steel thereof.

To permit the air to escape from the vessel as fluid is pumped into the interior, a threaded opening 10 is provided through the wall of the vessel and a stem 11 with valve 12 is threaded therein. In Fig. 3 where the vessel is lying horizontally the opening 10 is located at the top of the vessel in a one layer section such as the head 4. After the vessel is filled with fluid and all the air is dispelled, the valve 12 is closed and pressure increased. Various other means for applying the pressure and relieving the air may be employed, the method here described being merely illustrative of one suitable means.

Gauge readings may be taken showing the increase in volume of fluid used, which readings will indicate the expansion of the inner layer of the vessel. Where vents 13 are distributed throughout the outer layers, as described in the Stresau patent, any leak that may occur in the inner shell, may be quickly observed before higher pressures are reached.

Such vents serve the further useful purpose of releasing any air which may be contained between the layers and permit the ready expansion of layers during pressure application.

During the initial period of pressure application, no expansion of the outer layers occurs because the inner layers are able to expand without affecting the outer layers due to the tolerances previously mentioned. As the pressure is increased, the outer layers begin to pick up the load until eventually expansion of the outside layer is observed.

If the layers of the vessel are expanded beyond the elastic limit of the steel a permanent deformation or set will be obtained and removal of the pressure will not cause the structure to regain its original form. In expanding a layer vessel it is possible to stretch the steel in the inner layers beyond the elastic limit without giving the outer layers a permanent deformation. However, to be certain that the inner layers are actually stretched beyond the elastic limit a certain amount of permanent expansion should be transmitted to the outer layers. Otherwise when the pressure is released and the outside layer returns to its original shape the inner layers may shrink back without having become permanently expanded into the outer structure. The fact that the outside layer is permanently expanded indicates that the inner layers have been permanently stretched into the outer structure, and that the elastic return of the several layers upon release of pressure will be substantially equal; thereby maintaining the layers in uniform tight contact throughout.

Tests have been performed in which the outside layer has been given a slight permanent set and measurements taken to determine the increase in the circumference of the vessel. The desired increase in circumference can be calculated from the dimensions of the vessel and the yield point of the steel. When the outside layer is given this set, the desired pre-stressing condition exists with the inner layers stretched beyond the yield point and permanently expanded against the outer layers.

Subsequently when the vessel is placed in commercial operation, the application of internal pressure will be resisted by the outer layers as well as the inner layers of the vessel. Due to the close contact, the inner layers will immediately transmit a portion of the load to the outer layers and through this distribution the whole vessel will act as a unit.

Measurements taken around the outside circumference of the vessel have indicated that during the pre-stressing operation, no visible expansion occurs until relatively high pressures are reached. This fact shows that in certain instances, unless the present invention is followed, tolerances may prevent obtaining close contact between layers and illustrates how under working conditions the outer layers may never be used in resisting pressure. After the pre-stressing treatment has been given the vessel, subsequent pressures are immediately reflected in the expansion of the outside circumference, showing that the load is immediately picked up by all the layers.

During this process the inner layers will be placed in compression. This is due to the greater elastic return of the outer layers over that of the inner layers.

One of the great advantages of a multi-layer vessel arises from the fact that the inner layer or layers may be made of an alloy steel capable of resisting corrosion or hydrogen embrittlement. In selecting such alloys, a steel having a low yield point may be employed to obtain the effect just described. The outer layers may be constructed of a plain carbon steel or some other steel having a higher yield point.

A slight amount of compression in the inner layers is desirable as insuring the existence of the perfect nesting relation sought. When the inner layers are placed under an initial compression stress as explained above they will take substantially no load during the application of low pressures in service, but since, due to the thick walls the stress is increased more rapidly in the inner layers than in the outer layers, the inner layers will be stressed more nearly equal to the outer layers under high working pressures.

Under the present invention, the permanent set of the layers may be obtained under desirable conditions and there is then no subsequent danger of injuriously affecting the steel either by repeatedly stretching the steel within its elastic limits or by stretching the steel beyond its elastic limit while the vessel is in operation under extreme temperature conditions. Moreover by permitting the distribution of stresses on the outer as well as the inner layers during all operating pressures, the most favorable design is accomplished.

The invention having been described, what is claimed and sought to be secured by Letters Patent is:

The method of improving the stress distribution under load of a multi-layer pressure vessel which comprises, displacing the air in the vessel with a relatively incompressible fluid medium which is relatively inexpansible at the temperatures and pressures employed, applying pressure to said medium to exert pressure against the walls of the vessel and stretch the layers thereof until all of the layers are in uniform tight contact throughout, raising the pressure further until the metal of all of the layers has been stressed at least to its elastic limit and the elastic return of the outer layers will be equal to or greater than the elastic return of the inner layers, and then releasing the pressure and effecting a return of the layers commensurate with the elastic return of the metal and with the layers maintained in substantially close contact throughout.

WILLIAM R. KEPLER.